UNITED STATES PATENT OFFICE.

CECIL N. HAKE, OF ALBYN HOUSE, FULHAM, ENGLAND.

MANUFACTURE OF POTASSIUM SULPHATE FROM KAINIT.

SPECIFICATION forming part of Letters Patent No. 229,249, dated June 29, 1880.

Application filed February 17, 1880. Patented in England October 18, 1879.

*To all whom it may concern:*

Be it known that I, CECIL N. HAKE, of Albyn House, Fulham, in the county of Middlesex, England, have invented a new and useful Improvement in the Manufacture of Sulphate of Potash, which is fully set forth and described in the following specification.

The invention relates to the manufacture of potassium sulphate from kainit; and it consists in the following consecutive processes:

First, in adding a more or less concentrated solution of magnesium sulphate (Kieserit Epsoms) to ground kainit, or the reverse, whereby the chlorides of magnesium and sodium go into solution and are separated from the residue by decantation. This process can be carried out either hot or cold. In the former case kainit is completely dissolved in a hot and nearly-saturated solution of magnesium sulphate and the solution allowed to cool slowly, whereby a crystalline deposit of the salt $K_2SO_4 + Mg.SO_4 + (6aq.,)$ commonly called schönit, is formed in the lye. In the latter case a cold solution of magnesium sulphate is added to finely-ground kainit and the mixture well stirred, by which process the chlorides of magnesium and sodium go into solution and may afterward be removed by decantation, and a residue is left which contains the salt $K_2SO_4 + Mg.SO_4 + (6aq.)$ as a crystalline powder mixed with more or less magnesium sulphate.

In the second process schönit, in a fine state of division, is mixed with finely-ground lime, baryta, or strontia, or the carbonates of these substances, the said substances being preferably moistened while mixing them, in order to obtain a more complete mixture.

When lime is used the most advantageous proportions are one hundred parts of uncalcined or seventy-three and one-half parts of calcined schönit to fourteen parts of lime, more or less, corresponding to the equation $K_2SO_4 + Mg.SO_4 + (6\ aq.) + CaO = K_2SO_4 + CaSO_4 + Mg.O + (6aq.)$ This mixture of schönit and lime is, when uncalcined schönit has been taken, at first nearly dry, but gradually becomes plastic. The so-obtained product is now either to be calcined or left to itself for some days, the result being in both cases a hard mass, from which the potassium sulphate can be extracted by lixiviation without difficulty.

When baryta or strontia salts are used an equivalent proportion of such salts is to be taken. By repeatedly using the so-obtained lyes for further extraction of potassium sulphate the quantity of water is reduced to a minimum, the solubility of the gypsum much reduced, and any sulphate of magnesia contained in the lye at once removed, so that the lye contains potassium sulphate with only a small proportion of impurities.

I claim—

1. In the manufacture of potassium sulphate from kainit, the production of schönit by the following successive steps, consisting in (*a*) adding a more or less concentrated cold solution of magnesium sulphate (Kieserit Epsoms) to ground kainit, or the reverse, or dissolving kainit in a hot solution of magnesium sulphate; (*b*) stirring the mixture, if the process is applied cold, whereby the chlorides of magnesium and sodium go into solution and a residue of schönit is formed, or allowing the solution to cool, if the process is applied hot, whereby a deposit of schönit is obtained; (*c*) separating the schönit thus formed as the deposit or residue from the chlorides of magnesium and sodium by decantation.

2. In the production of potassium sulphate from kainit, the method of separating the potassium sulphate from the other constituents of schönit, consisting (*a*) in the addition of caustic lime, baryta, or strontia, or the carbonates of these bases, to schönit in a fine state of division, with or without the addition of water; (*b*) in calcining or drying the so-obtained product, so as to convert it into a hard mass; (*c*) in lixiviating the hard mass with water and concentrating the so-obtained lye, if desired, by applying it again for lixiviation, whereby a more or less pure solution of potassium sulphate is obtained.

In testimony whereof I have signed this specification in the presence of two subscribing witnesses.

C. N. HAKE.

Witnesses:
H. J. HADDAN,
D. H. MCLAUCHLAN,
*Both of 67 Strand.*